United States Patent
Dieckmann

(10) Patent No.: US 6,203,116 B1
(45) Date of Patent: Mar. 20, 2001

(54) METHOD FOR OPERATING AN ELECTROMECHANICAL BRAKE SYSTEM

(75) Inventor: Thomas Dieckmann, Pattensen (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 09/335,510

(22) Filed: Jun. 10, 1999

(30) Foreign Application Priority Data

Jun. 25, 1998 (DE) .............................................. 198 28 331

(51) Int. Cl.[7] ..................................................... B60T 13/66
(52) U.S. Cl. ........................ 303/20; 303/122; 303/122.04
(58) Field of Search ........................ 303/20, 122, 122.03, 303/122.04, 122.05; 307/125; 188/158, 156

(56) References Cited

U.S. PATENT DOCUMENTS

| | | | |
|---|---|---|---|
| 4,661,910 | * 4/1987 | Reinecke et al. | 364/426 |
| 4,745,542 | * 5/1988 | Baba et al. | 364/184 |
| 5,302,008 | * 4/1994 | Miyake et al. | 303/14 |
| 5,752,748 | * 5/1998 | Schramm et al. | 303/20 |
| 5,810,454 | * 9/1998 | Prinzler et al. | 303/20 |
| 5,829,845 | 11/1998 | Maron et al. | 303/20 |
| 5,897,596 | * 4/1999 | Kabune et al. | 701/29 |
| 5,902,019 | * 5/2000 | Maron et al. | 303/15 |
| 5,952,799 | * 9/1999 | Maisch et al. | 318/362 |
| 5,961,190 | * 10/1999 | Brandmeier et al. | 303/152 |
| 5,962,931 | * 10/1999 | Maron et al. | 307/125 |
| 6,000,507 | * 12/1999 | Bohm et al. | 188/158 |
| 6,088,638 | * 7/2000 | Behrends et al. | 701/43 |
| 6,092,879 | * 7/2000 | Kornhaas et al. | 303/122.04 |

FOREIGN PATENT DOCUMENTS

| | | |
|---|---|---|
| 3410006 | 9/1985 | (DE) . |
| 196 01 983 | 7/1997 | (DE) . |
| 196 43 949 | 5/1998 | (DE) . |
| 19734598 | 2/1999 | (DE) . |
| 0 520 525 | 12/1992 | (EP) . |
| WO 90/15743 | 12/1990 | (WO) . |
| WO 00/00374 | 1/2000 | (WO) . |

* cited by examiner

Primary Examiner—Robert J. Oberleitner
Assistant Examiner—Benjamin A. Pezzlo
(74) Attorney, Agent, or Firm—Smith, Gambrell & Russell, LLP

(57) ABSTRACT

A method is disclosed for operating an electromechanical brake system 2 of a motor vehicle that contains two brake circuits 24 and 28 that are powered by the on-board network 20 in the normal mode and by the respective emergency power storage mechanisms 22a and 22b in the emergency mode. In the emergency mode of the brake system 2, one of the two brake circuits 24, 28 is only operated by the control unit 10 until the emergency power storage mechanism 22b assigned to this brake circuit 28 has reached a residual power value that is sufficient for locking the wheels of this brake circuit at least once while the motor vehicle is at a standstill.

6 Claims, 1 Drawing Sheet

METHOD FOR OPERATING AN ELECTROMECHANICAL BRAKE SYSTEM

INTRODUCTION AND BACKGROUND

The present invention pertains to a method for operating an electromechanical brake system of a motor vehicle that contains the following components:

brake actuators, one assigned to each wheel of the motor vehicle, a control unit for controlling or regulating the brake system, and two brake circuits that operate independently of one another and are supplied with power by an on-board network of the motor vehicle in the normal mode.

Brake systems of the Brake-By-Wire type were recently developed for motor vehicles, in particular, for passenger cars. In brake systems of this type, the driver decelerates the motor vehicle by exerting a force upon the brake pedal with the foot, wherein the effect of this force exerted upon the pedal is detected by a sensor and converted into an electric signal. The signal is forwarded to individual brake actuators that are assigned to each wheel of the motor vehicle and each brake actuator exerts a braking force upon the wheel of the motor vehicle, among other things with the aid of an electric motor. In contrast to conventional brake systems, the brake actuating power required for a braking maneuver is not made available in mechanical form, but rather in electrical form. Consequently, electric brake power storage mechanisms need to be provided that can supply the brake system with the required electric power during a braking maneuver. In the normal mode, an electromechanical brake system is usually powered by the on-board network of the motor vehicle.

It is no longer possible to power the brake system via the on-board network if this on-board network becomes defective or fails. For these cases, according to one legal requirement, it must also be possible to bring the motor vehicle to a standstill reliably after a certain number of brake actuations. In addition, it should also be possible to park the motor vehicle reliably, i.e., to secure the motor vehicle by actuating a parking brake that acts upon the brakes of the brake system.

An electromechanical brake system of the initially mentioned type that is supplied with electric power by the on-board network in the normal mode of the motor vehicle is known from DE 34 10 006 A1. The brake system described in this publication contains another brake circuit that is either provided in the form of a hydraulic or a mechanical brake circuit and functionally connected to the brake pedal of the brake system in addition to an electric brake circuit. Preferably, the additional brake circuit acts exclusively upon the wheels of the front axle of the motor vehicle. The mechanical brake system that is embodied with the aid of bowden cables may also be connected functionally to a manually actuated parking brake lever. If a malfunction occurs in the brake system or if there is a failure in the on-board network that leads to a failure of the electric circuit of the brake system, the brake pedal can be actuated beyond a pressure point such that the vehicle is decelerated with the aid of the hydraulic brake circuit or the mechanical brake circuit. A reliable deceleration of the motor vehicle consequently is also possible if the on-board network malfunctions or fails. In addition, the safe parking of the motor vehicle can be realized if the second brake circuit of the brake system is provided in the form of a mechanical brake circuit. In this case, the wheels of the front axle of the motor vehicle can be locked by actuating the parking brake lever while the motor vehicle is at a standstill.

The previous explanations indicate that the brake system known from DE 34 10 006 A1 fulfills the initially mentioned requirements. However, this electromechanical brake system has a complicated design because it contains a hydraulic or mechanical brake circuit in addition to an electric brake circuit. Consequently, this brake system is not able to obtain the objective of the invention, namely the creation of a reliable and exclusively electromechanical brake system (i.e., a brake system that does not contain an additional hydraulic or exclusively mechanical brake circuit).

It is accordingly an object of the present invention to be able to operate an exclusively electromechanical brake system that makes it possible to reliably decelerate and safely park a motor vehicle even if the on-board network malfunctions or fails.

A further object of the invention is to have a mechanical brake system for carrying out the aforementioned method.

SUMMARY OF THE INVENTION

The above and other objects of the present invention can be achieved by a method comprising:

monitoring the voltage of the on-board network in a control unit, wherein the electromechanical brake system operates in the normal mode if the voltage of the on-board network exceeds a predetermined value, and wherein the brake system operates in the emergency mode if the voltage of the on-board network voltage falls below a predetermined value, and following the features listed below:

both brake circuits are operated if the brake system is actuated in the normal mode, if the brake system is actuated in the emergency mode, only one of the two brake circuits can be operated until the emergency power storage mechanism assigned to this brake circuit is depleted, wherein the other brake circuit is only operated until the emergency power storage mechanism assigned to this brake circuit has reached a residual power value that is sufficient for locking the wheels of this brake circuit at least once while the motor vehicle is at a standstill.

The objective with respect to the brake system for carrying out this method can be achieved with the electromechanical brake system for motor vehicle comprising brake actuators one assigned to each wheel of the motor vehicle, a control unit for controlling or regulating the brake system, and two brake circuits that operate independently of one another and are supplied with power by an on-board network of the motor vehicle in the normal mode, wherein one emergency power storage mechanism, which supplies the respective brake circuits with power in the emergency mode, is assigned to each brake circuit, and a differentiation between the normal mode and the emergency mode can be made in the control unit, and both brake circuits are operated by the control unit in the normnal mode of the brake system, and in the emergency mode of the brake system, only one of the two brake circuits is operated by the control unit until the emergency power storage mechanism assigned to this brake circuit has reached a residual power value that is sufficient for locking the wheels of this brake circuit while the motor vehicle is at a standstill.

BRIEF DESCRIPTION OF DRAWING

The present invention will be further understood with reference to the accompanying drawing which is a schematic representation of the electromechanical brake system of the invention.

DETAILED DESCRIPTION OF INVENTION

Figure 1:
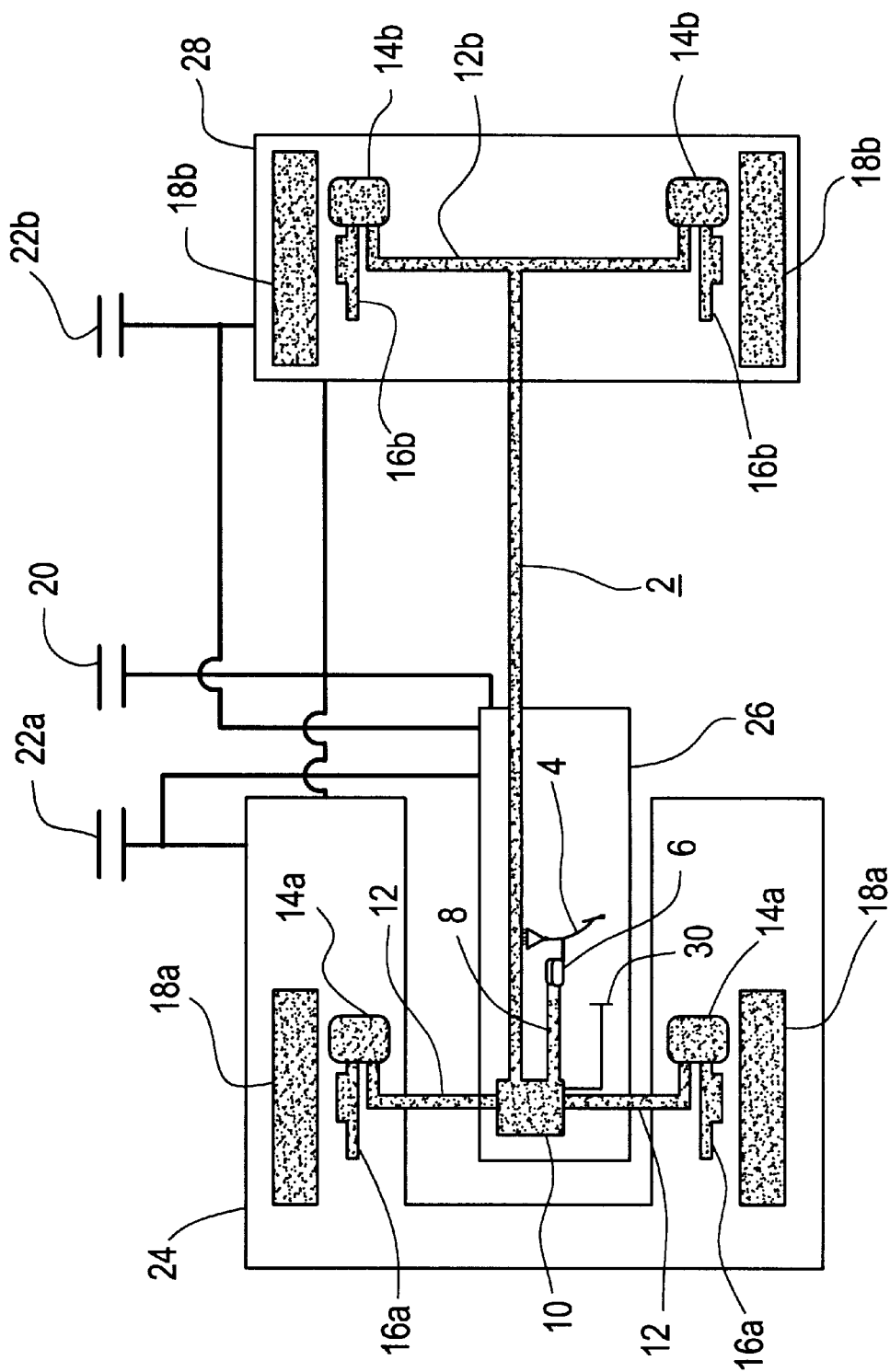

The present invention will now be described in further detail.

The main advantage of the invention can be seen in the fact that the brake system represents an exclusively electromechanical brake system, i.e., a brake system that does not contain an additional hydraulic or mechanical brake circuit. This brake system makes it possible to reliably decelerate the motor vehicle with a certain number of braking activations even if the on-board network malfunctions or fails. This is ensured by the brake circuit, that can use the emergency power storage mechanism until it is depleted. The motor vehicle can also be safely parked because the other emergency power storage mechanism, which supplies the other brake circuit, always contains sufficient residual power. Another advantage is that the electromechanical brake system according to the invention is inexpensive to realize because it does not require any elements that are not already provided.

The brake actuators of the brake circuit used for safely parking the motor vehicle each contain a parking brake that makes it possible to lock the clamping device of the brake actuators with a previously adjusted clamping force while the motor vehicle is at a standstill. In this case, power is only consumed for tightening the clamping device and for actuating the parking brake, wherein the tightened clamping device is held in this position without consuming, power. Due to the adjusted clamping force, a braking force is exerted upon the wheels assigned to these brake actuators, i.e., the wheels are locked. Corresponding brake actuators are, for example, known from EP 0 520 525 A1 and DE 196 01 983 C1. If brake actuators of this type are used, the residual power value of the emergency power storage mechanism needs to be set such that the brake actuators can still be tightened once while the motor vehicle is at a standstill and that the parking brakes of the brake actuators can be actuated.

According to an additional refinement of the invention, the residual power value of the emergency power storage mechanism assigned to the brake circuit for safely parking the motor vehicle is measured, and this brake circuit is no longer operated while the motor vehicle is driven once a residual power value is reached that is sufficient for locking the wheels of this brake circuit at least once while the motor vehicle is at a standstill, i.e., this brake circuit no longer contributes to decelerating the motor vehicle. The measurement of the residual power value may take place continuously or discretely during each braking activation. The advantage of this additional refinement can be seen in the fact that the motor vehicle is decelerated by both brake circuits in the emergency mode until the predetermined residual power value is reached.

According to an additional refinement of the invention, the brake circuit for safely parking the motor vehicle is operated for a certain number of actuations of the brake system in the emergency mode of the brake system. However, this brake circuit is no longer operated during further actuations of the brake system while the motor vehicle is driven. The additional refinement of the invention relies on the fact that each emergency power storage mechanism contains sufficient power for a predetermined number of actuations of the brake circuits when the brake system switches into the emergency mode, since the emergency power storage mechanisms are not used in the normal mode of the brake system. A brake circuit that does not use the emergency power storage mechanism in the normal mode is described, for example, in the subsequently published German patent application 197 34 598 of the assignee hereof. For example, the emergency power storage mechanisms may be designed so that the brake circuits of the brake system can still be actuated ten times in the emergency mode before they are depleted.

The advantage of this additional refinement can be seen in the fact that an exact monitoring of the power contained in the emergency power storage mechanism assigned to the brake circuit for safely parking the motor vehicle is not necessary. In this case, the number of actuations of the brake system merely needs to be counted, e.g., by the control unit. If the emergency power storage mechanism contains sufficient power for ten actuations of the brake circuit when the brake system switches from the normal mode to the emergency mode, the brake circuit assigned to this emergency power storage mechanism is no longer operated by the control unit after nine actuations, i.e., this brake circuit no longer contributes to decelerating the motor vehicle. This brake circuit can then be used one more time while the motor vehicle is at a standstill in order to safely park the motor vehicle with the aid of this brake circuit.

According to an additional refinement of the invention, the brake circuit of the brake system that aids in safely parking the motor vehicle is no longer operated while the motor vehicle is driven if the brake system switches into the emergency mode. The advantage of this additional refinement can be seen in the fact that the power content of the emergency power storage mechanism does not have to be monitored at all (neither by measurements nor by counting the number of brake actuations). In this case, it is automatically ensured that the emergency power storage mechanism has a residual power value that is sufficient for safely parking the motor vehicle because the emergency power storage mechanism is not used in the normal mode of the brake system.

According to a still further additional refinement of the invention, the brake circuit used for safely parking the motor vehicle is no longer operated when the brake system switches into the emergency mode unless the emergency power storage mechanism of the other brake circuit is depleted. The depletion of the emergency power storage mechanism of the other brake circuit can be detected, for example, by the control unit by measuring the power content or by counting the number of actuations of the brake system. The advantage of this additional refinement can be seen in the fact that the motor vehicle can also be reliably decelerated if the emergency power storage mechanism of one brake circuit is depleted because in these cases, the power content of the second emergency power storage mechanism is always available. The brake system can be operated with the aid of the second brake circuit until the emergency power storage mechanism assigned to this brake circuit has reached a residual power value that is sufficient for locking the wheels of this brake circuit at least once while the motor vehicle is at a standstill. This additional refinement makes it possible to "prolong" the emergency mode of the brake system.

In all embodiments of the invention, the driver of the motor vehicle is informed when the brake system switches from the normal mode into the emergency mode, i.e., the driver is able to reliably decelerate and safely park the motor vehicle in timely fashion. In the last two embodiments described above, the driver of the motor vehicle also notices the transition into the emergency mode due to the fact that the motor vehicle is only decelerated by one brake circuit, i.e., the braking force is diminished in comparison to the normal mode.

An embodiment and additional advantages of the invention are described below with reference to the enclosed figure.

The figure shows a schematic representation of an electromechanical brake system 2, wherein only the components required for the following description are shown. The electromechanical brake system 2 contains a brake pedal 4 and a brake pedal sensor 6. The electromechanical brake system 2 is actuated when the foot of the driver exerts a force upon the brake pedal 4, and the brake pedal 4 is moved from a starting position into an actuating position. The position of the brake pedal 4 is detected by the brake pedal sensor 6, and a signal that corresponds to the position of the brake pedal 4 is forwarded to the control unit 10 via the line 8. The total braking force requested by the driver of the motor vehicle is divided into individual braking forces in the control unit 10, wherein signals that correspond to the individual braking forces are forwarded to the brake actuators 14a of the front axle and 14b of the rear axle of the motor vehicle via the lines 12. In the brake actuators 14a and 14b, clamping forces are exerted upon the brake disks 16a and 16b with the aid of electric motors and clamping devices, wherein said clamping forces correspond to the requested individual braking forces such that the wheels 18a and 18b of the motor vehicle are decelerated.

In the normal mode, all components of the electromechanical brake system 2 are supplied with electric power by the on-board network 20. This pertains, in particular, to the brake actuators 14a of the first brake circuit that is bordered by the box 24, the brake actuators 14b of the second brake circuit that is bordered by the box 28, and the control unit 10 and the brake pedal sensor 6 that are bordered by the box 26. This is schematically illustrated in the form of respective electric lines that lead from the on-board network 20 to the boxes 24, 26 and 28. The voltage of the on-board network 20 is constantly monitored by the control unit 10. The control unit 10 registers malfunctions or failures of the on-board network 20 that would cause the voltage of the on-board network to drop below a predetermined limiting value. Then, the electromechanical brake system 2 would switch from the normal mode into the emergency mode, which is described below.

In the emergency mode, the electromechanical brake system 2 is supplied with electric power by the emergency power storage mechanisms 22a and 22b. In this case, the first brake circuit (see box 24) is supplied with electric power by the emergency power storage mechanism 22a, the second brake circuit (see box 28) is supplied with electric power by the emergency power storage mechanism 22b, and the common components of the electromechanical brake system (see box 26) are respectively supplied with electric power by the emergency power storage mechanism 22a and the emergency power storage mechanism 22b. In the emergency mode, one of the two brake circuits of the electromechanical brake system is only operated by the control unit 10 until the respective emergency power storage mechanism 22a or 22b assigned to this brake circuit contains a residual power value that is sufficient for locking the wheels assigned to this brake circuit while the motor vehicle is at a standstill. The following description is based on the assumption that the wheels 18b of the rear axle of the motor vehicle should be locked while the motor vehicle is at a standstill, i.e., that the emergency power storage mechanism 22b assigned to this brake circuit needs to contain a sufficiently high residual power value. However, it should be expressly noted that the wheels of the front axle or two arbitrary wheels of the motor vehicle can also be locked if the brake circuits are divided differently. The following explanations apply analogously.

According to a first embodiment of the invention, the power content of the emergency power storage mechanism 22b is constantly monitored by the control unit 10 in the emergency mode of the electromechanical brake system 2. If the power content of the emergency power storage mechanism 22b is above the residual power value required for locking the wheels 18b while the motor vehicle is at a standstill, the total braking force defined by the driver of the motor vehicle is divided into individual braking forces in the control unit 10, and the individual braking forces are forwarded to the respective brake actuators 14a and 14b. Corresponding clamping forces are then adjusted in the respective brake actuators 14a and 14b.

However, if the control unit 10 "determines" that the power content of the emergency power storage mechanism 22b has reached the predetermined residual power value, the control unit 10 causes the brake actuators 14b to no longer participate in decelerating the moving motor vehicle. This can be realized in such a way that the signals that correspond to the individual braking forces to be adjusted on the brake actuators 14b are no longer forwarded to the brake actuators 14b by the control unit 10. The brake actuators 14b of the brake circuit that are powered by the emergency power storage mechanism 22b (see box 28) then no longer consume power, i.e., the power content of the emergency power storage mechanism 22b is preserved when the brakes of the moving motor vehicle are actuated and always corresponds to the predetermined residual power value.

If it is intended to safely park the motor vehicle, the driver may actuate the actuating switch 30 for the braking brake (see box 26) while the motor vehicle is at a standstill so that a corresponding signal is forwarded to the control unit 10. The control unit then forwards a signal to the brake actuators 14b via the line 12. Due to this signal, a clamping force is built up in the brake actuators 14b so that a braking force is exerted upon the brake disks 16b and the wheels 18b are locked with the aid of this braking force. Examples of the process of locking the wheels 18b with the aid of the brake actuators 14b while the motor vehicle is at a standstill can be found in EP 0 520 525 A1 and DE 196 01 983 C1.

According to a second embodiment of the invention, the control unit 10 counts how many times the electromechanical brake system is actuated in the emergency mode. This second embodiment uses the fact that the emergency power storage mechanisms 22a and 22b have their maximum predetermined power content at the beginning of the emergency mode, since the emergency power storage mechanisms 22a and 22b are not used in the normal mode. An electromechanical brake system that does not use the emergency power storage mechanisms in the normal mode is described, for example, in the subsequently published German patent application 197 34 598 of the assignee hereof. The predetermined maximum power content of the emergency power storage mechanisms 22a and 22b is sufficient for a predetermined number of actuations of the first brake circuit (see box 24) and the second brake circuit (see box 28), respectively. The following description is based on the assumption that the power content of the respective emergency power storage mechanisms 22a and 22b is sufficient for N actuations of the brake circuits. If the control unit 10 determines that the electromechanical brake system 2 has been actuated (N−1) times in the emergency mode, the control unit 10 causes the second brake circuit (see box 28) to no longer participate in ensuing braking maneuvers so that the power content of the emergency power storage mechanism 22b is preserved. This can be realized as described above in connection with the first embodiment. The power content of the emergency power storage mechanism 22b then still is sufficient for actuating the brake actuators 14b once. This residual power value can be used for locking the wheels 18b of the brake circuit while the motor vehicle is at a standstill. This is also realized in accordance with the previous description of the first embodiment.

According to a third embodiment of the invention, the second brake circuit (see box 28) is no longer operated at all in the emergency mode, i.e., this brake circuit is no longer actuated by the control unit 10. This results in the emergency power storage mechanism 22b not being used at all in the emergency mode of the electromechanical brake system 2, i.e., the power content of the emergency power storage mechanism 22b is preserved entirely. The power content of the emergency power storage mechanism 22b is then available for locking the wheels 18b with the aid of the brake actuators 14 while the motor vehicle is at a standstill. The locking of the wheels 18b in this embodiment takes place analogous to the previous description of the first embodiment.

According to a fourth embodiment of the invention, the brake system is controlled almost exactly like the third embodiment. However, once the power of the first power storage mechanism 22a is depleted (which can be monitored by the control unit 10, for example, by monitoring the power content or by counting the actuations of the electromechanical brake system 2) so that the first brake circuit of the electromechanical brake system 2 (see box 24) can no longer be actuated, the control unit 10 subsequently uses only the second brake circuit (see box 28) of the electromechanical brake system 2. The electromechanical brake system 2 can then still be actuated with the aid of the emergency power storage mechanism 22b, even if the emergency power storage mechanism 22a is depleted, until a residual power value is reached in the emergency power storage mechanism 22b that is sufficient for locking the wheels 18b of the motor vehicle while the motor vehicle is at a standstill. In the fourth embodiment, the power content of the emergency power storage mechanism 22b can be monitored in accordance with the previous descriptions of the first or second embodiment. The residual power value of the emergency power storage mechanism 22b can be used for safely parking the motor vehicle.

In the figure, it was assumed that the first brake circuit (see box 24) contains the wheels 18a of the front axle of the motor vehicle, and that the second brake circuit (see box 28) contains the wheels 18b of the rear axle of the motor vehicle. However, the invention is not limited to this specific design. The first brake circuit may contain, for example, the left front wheel and the right rear wheel, wherein the second brake circuit correspondingly contains the other wheels of the motor vehicle. In this respect, it is merely essential for the reliable operation of the invention that two brake circuits that are functionally separated from one another are provided, wherein the respective brake circuits are supplied by separate emergency power storage mechanisms 22a and 22b, respectively. Any suitable source of power can be used in accordance with the present invention as will be understood by those skilled in the art.

Further variations and modifications of the foregoing invention will be apparent to those skilled in the art after reading the above and are intended to be encompassed by the claims appended thereto.

German priority application 198 28 331.8 is relied on and incorporated herein by reference.

We claim:

1. A method for operating an electromechanical brake system of a motor vehicle that contains the following components:
   brake actuators, one assigned to each wheel of the motor vehicle,
   a control unit for controlling or regulating the brake system, and a first and second brake circuit that operate independently of one another and are supplied with power by an on-board network of the motor vehicle in the normal mode, said method comprising:
   monitoring the voltage of an on-board network in a control unit, wherein the electromechanical brake system operates in a normal mode if the voltage of the on-board network exceeds a predetermined value, and wherein the brake system operates in the emergency mode if the voltage of the on-board network voltage falls below a predetermined value, operating both brake circuits if the brake system is actuated in the normal mode, with the proviso that if the brake system is actuated in the emergency mode, only the first one of the two brake circuits can be actuated until an emergency power storage mechanism assigned to the first brake circuit is depleted,
   wherein only the second brake circuit is operated until the emergency power storage mechanism assigned to the second brake circuit has reached a residual power value that is sufficient for locking the wheels the second brake circuit at least once while the motor vehicle is at a standstill.

2. The method for operating an electromechanical brake system according to claim 1, further comprising measuring the residual power value of the emergency power storage mechanism assigned to the brake circuit for safely parking the motor vehicle, and ceasing operating the second brake circuit while the motor vehicle is driven once a residual power value is reached that is sufficient for locking the wheels of the second brake circuit at least once while the motor vehicle is at a standstill.

3. The method for operating an electromechanical brake system according to claim 1, further comprising in the emergency mode of the brake system, operating the second brake circuit for safely parking the motor vehicle for a certain number of actuations of the brake system, wherein the second brake circuit is no longer operated during additional actuations of the brake system while the motor vehicle is driven.

4. The method for operating an electromechanical brake system according to claim 1, wherein the second brake circuit of the brake system, which serves for safely parking the motor vehicle is no longer operated when the brake system switches into the emergency mode while the motor vehicle is driven.

5. The method for operating an electromechanical brake system according to claim 1, further comprising ceasing operation of the second brake circuit that serves for safely parking the motor vehicle when the brake system switches into the emergency mode while the motor vehicle is driven unless the emergency power storage mechanism of the first brake circuit is depleted.

6. An electromechanical brake system for a motor vehicle comprising a plurality of brake actuators, one brake activator assigned to each wheel of the motor vehicle, a control unit for controlling or regulating the brake system, and a first and a second brake circuits that operate independently of one another and are supplied with power by an on-board network of the motor vehicle in a normal mode, an emergency power storage mechanism, which supplies the first and second brake circuits with power in an emergency mode, assigned to each brake circuit whereby a differentiation between the normal mode and the emergency mode can be made in the control unit and both brake circuits are operated by the control unit in the normal mode of the brake system, and in the emergency mode of the brake system, only one of the two brake circuits is operated by the control unit until the emergency power storage mechanism assigned to a second brake circuit has reached a residual power value that is sufficient for locking the wheels of the second brake circuit while the motor vehicle is at a standstill.

* * * * *